M. A. SMITH.
DISH PAN.
APPLICATION FILED NOV. 13, 1916.
1,239,834.
Patented Sept. 11, 1917.
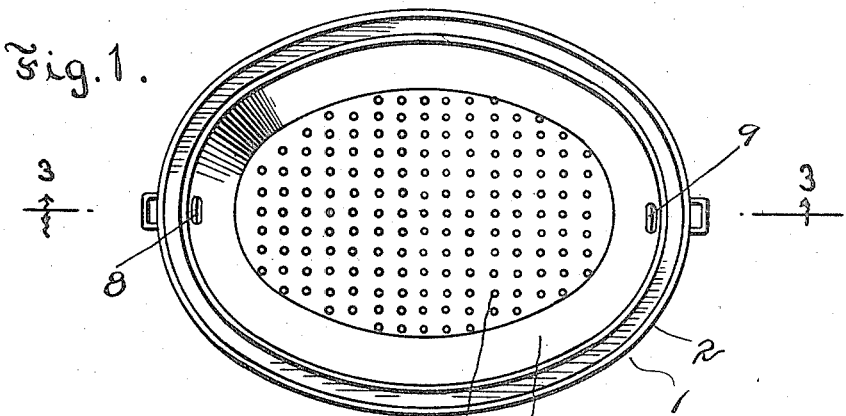
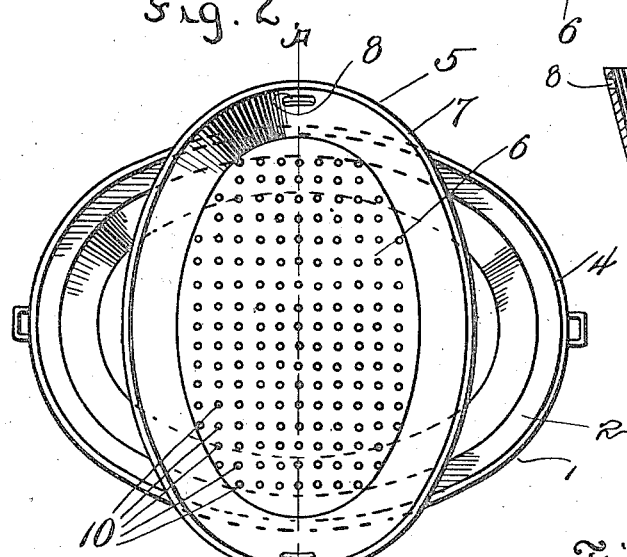
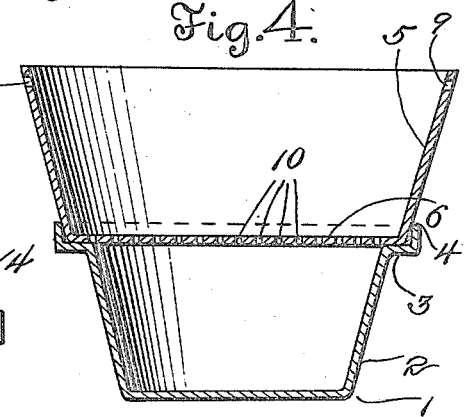
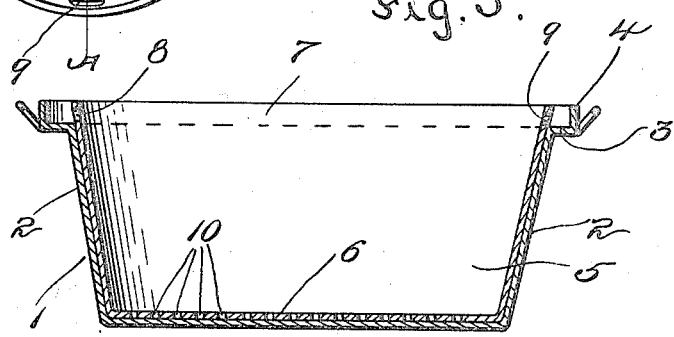
Witnesses
Bo Smith
D. J. Trace
Inventor
M. A. Smith
By Marvin A. Smith
Attorney

UNITED STATES PATENT OFFICE.

MARVIN A. SMITH, OF COTTONWOOD, ALABAMA.

DISH-PAN.

1,239,834.  Specification of Letters Patent.  Patented Sept. 11, 1917.

Application filed November 13, 1916. Serial No. 131,072.

*To all whom it may concern:*

Be it known that I, MARVIN A. SMITH, a citizen of the United States, residing at Cottonwood, in the county of Houston and State of Alabama, have invented certain new and useful Improvements in Dish-Pans, of which the following is a specification.

This invention relates to kitchen articles and has for its object to provide an improved dish washing pan in which means is provided for quickly draining the washed dishes.

Another object of the invention is to provide a pair of nesting pans, the inner of which is perforated.

A still further object of the invention is to provide a pair of nesting pans in which the width of the upper part of the outer pan is equal to the length of the bottom of the inner pan whereby the latter may be held seated transversely upon said upper part of the outer pan.

With the above and other objects in view, I have invented the device illustrated in the accompanying drawings, in which—

Figure 1 is a top plan of my invention,
Fig. 2 is a similar view showing a different position of an inner pan,
Fig. 3 is a section on line 3—3, Fig. 1, and
Fig. 4 is a section on line A—A, Fig. 2.

Like reference characters indicate like parts throughout the following specification and in the several views in the drawings in which 1 indicates an oval pan with oblique side walls 2, the upper part of which terminates in a horizontal flange 3 having its edge 4 formed at a right angle thereto. Seated within the pan 1 is a similarly shaped draining pan 5, the bottom wall 6 of which is perforated and of a length equal to the width of the longitudinal center of the upper part of the pan 1 so that the pan 5 may be seated transversely upon the pan 1 and rest upon the flange 3 fitting the same snugly at its center, the edge 4 preventing accidental relative movement between the two pans, thus preventing accidental displacement of the draining pan 5 when seated upon the flange 3. The upper edge 7 of pan 5 extends above flange 3, so that the handle forming openings 8 and 9 will be free of access and above the oblique walls of pan 1.

The pans 5 and 1 are nested and dishes placed within the former and hot water poured thereover after which the pan 5 is lifted out of pan 1 and seated transversely thereon upon the flange 3 whereby all water from the dishes and pan 5 may drain through the perforation into pan 1.

It is, of course, understood that the pans 1 and 5 may be formed oblong as well as oval, however, the latter shape seems preferable.

Having now described my invention, that which I claim to be new and desire to procure by Letters Patent is:—

1. The described device consisting of inner and outer nesting pans, the walls of one seating flush against the walls of the other when in nesting relation, the bottom wall of the inner pan being perforated, and the outer pan having a horizontal ledge therearound terminating in a vertical flange, the upper edge of the inner pan having openings for handles adjacent its upper edge which extend above said ledge.

2. The described device consisting of inner and outer nesting pans, the walls of one seating flush against the walls of the other when in nesting relation, the bottom of the inner pan being perforated and the outer pan having a horizontal ledge therearound terminating in a vertical flange, the upper edge of the inner pan having openings for handles adjacent its upper edge which extend above said ledge, said pans being oval and having inclined side walls, the extreme width of said outer pan within said flange equaling the length of said bottom.

3. The described device consisting of inner and outer nesting pans, the bottom of the inner pan being perforated and the outer pan having a horizontal ledge therearound terminating in a vertical flange, the upper edge of the inner pan having openings for handles adjacent its upper edge which extend above said ledge, said pans being oval and having inclined side walls, the extreme width of said outer pan within said flange equaling the length of said bottom, said ledge forming a seat for the inner pan when the latter is mounted transversely on the outer pan.

4. The described device consisting of inner and outer nesting pans, the bottom of the inner pan being perforated and the outer pan having a horizontal ledge therearound terminating in a vertical flange, the extreme width of said outer pan within said flange equaling the length of said bottom, said ledge forming a seat for the inner pan when the latter is mounted transversely on the outer pan, said flange forming means for holding said inner pan against movement when seated upon the ledge.

5. The described device consisting of a pair of oval pans adapted to closely nest one within the other, said inner one having a perforated bottom, the outer of said pans having a horizontal ledge terminating in a right angular flange, said pans being of approximately the same depth, the side walls of said pans being oblique, the length of the bottom of the inner pan being equal to the width of the upper part of said outer pan whereby the inner pan may seat crosswise on said ledge and be held against movement by said flange.

6. The described device consisting of a pair of oval pans adapted to closely nest one within the other, said inner one having a perforated bottom, the outer of said pans having a horizontal ledge terminating in a right angular flange, said pans being of approximately the same depth, the side walls of said pans being oblique, the length of the bottom of the inner pan being equal to the width of the upper part of said outer pan whereby the inner pan may seat crosswise on said ledge and be held against movement by said flange, the side walls of said inner pan being imperforate whereby water will not escape over the edges of said outer pan when the pans are in transverse relation.

In testimony whereof I affix my signature in the presence of two witnesses.

MARVIN A. SMITH.

Witnesses:
 S. O. SMITH,
 A. L. WATFORD.